US010150077B2

(12) United States Patent
Wright

(10) Patent No.: US 10,150,077 B2
(45) Date of Patent: Dec. 11, 2018

(54) AIR DRYER CONTROL USING HUMIDITY

(71) Applicant: NEW YORK AIR BRAKE, LLC, Watertown, NY (US)

(72) Inventor: Eric C. Wright, Evans Mills, NY (US)

(73) Assignee: NEW YORK AIR BRAKE, LLC, Watertown (*) Notice: Subject to any disclaimer, the term of this patent is extended or adjusted under 35 U.S.C. 154(b) by 75 days.

(21) Appl. No.: 15/273,791

(22) Filed: Sep. 23, 2016

(65) Prior Publication Data

US 2017/0095766 A1 Apr. 6, 2017

Related U.S. Application Data

(60) Provisional application No. 62/236,960, filed on Oct. 4, 2015.

(51) Int. Cl.
| | |
|---|---|
| *B01D 53/04* | (2006.01) |
| *B01D 53/06* | (2006.01) |
| *B60T 17/00* | (2006.01) |
| *B01D 53/26* | (2006.01) |
| *B61H 13/34* | (2006.01) |
| *F15B 21/04* | (2006.01) |

(52) U.S. Cl.
CPC ..... *B01D 53/0407* (2013.01); *B01D 53/0454* (2013.01); *B01D 53/261* (2013.01); *B60T 17/004* (2013.01); *B61H 13/34* (2013.01); *B01D 2257/80* (2013.01); *B01D 2259/40009* (2013.01); *B01D 2259/4566* (2013.01); *F15B 21/048* (2013.01)

(58) Field of Classification Search
CPC ............ B01D 53/0407; B01D 53/0454; B01D 53/261; B01D 2257/80; B01D 2259/40009; B01D 2259/4566; B60T 17/004; B61H 13/34; F15B 21/048
USPC .......... 95/10, 11, 14, 117, 121, 122; 96/111, 96/112, 121; 34/80, 472, 473
See application file for complete search history.

(56) References Cited

U.S. PATENT DOCUMENTS

| | | | | |
|---|---|---|---|---|
| 3,448,561 | A | 6/1969 | Seibert et al. | |
| 4,127,395 | A * | 11/1978 | McKey | B01D 53/261 95/10 |
| 4,247,311 | A | 1/1981 | Seibert et al. | |
| 4,656,757 | A * | 4/1987 | Oschmann | F26B 21/083 34/473 |

(Continued)

FOREIGN PATENT DOCUMENTS

EP 2123343 11/2009

OTHER PUBLICATIONS

International Search Report and Written Opinion Form PCT/ISA/220, International Application No. PCT/US2016/053234, pp. 1-10, dated Dec. 9, 2016.

*Primary Examiner* — Frank M Lawrence, Jr.
(74) *Attorney, Agent, or Firm* — Bond Schoeneck and King PLLC; David Nocilly

(57) ABSTRACT

A railway air dryer that switches the flow and counter flow of air through each of two desiccant towers in response to the actual humidity of air being dried by the air dryer. The air dryer includes a humidity sensor, a temperature sensor in the outlet air, and a temperature sensor in the inlet air stream to determine when to initiate the regeneration of the desiccant. The air dryer system is generally specified to provide some minimum drying performance, for example 40° C. dew point suppression.

12 Claims, 6 Drawing Sheets

(56) References Cited

U.S. PATENT DOCUMENTS

| | | | | |
|---|---|---|---|---|
| 4,832,711 A * | 5/1989 | Christel, Jr. | ....... | B01D 53/0454 95/105 |
| 4,941,894 A * | 7/1990 | Black | ................... | B01D 53/047 95/122 |
| 7,279,026 B1 * | 10/2007 | Fresch | ................... | B01D 53/04 95/124 |
| 9,803,778 B2 * | 10/2017 | Wright | ................... | F16K 49/00 |
| 9,864,382 B2 * | 1/2018 | Wright | ................. | G05D 7/0635 |
| 2011/0232485 A1 * | 9/2011 | Ellsworth | ............ | B01D 53/261 95/91 |
| 2012/0012005 A1 * | 1/2012 | Burke | ................ | B01D 53/0454 96/111 |

\* cited by examiner

AIR DRYER CONTROL USING HUMIDITY

CROSS-REFERENCE TO RELATED APPLICATIONS

The present application claims priority to U.S. Provisional No. 62/236,960, filed Oct. 4, 2016.

BACKGROUND OF THE INVENTION

1. Field of the Invention

The present invention relates to desiccant air dryers and, more particularly to a system and method for controlling the regeneration cycle of a twin tower desiccant air dryer.

2. Description of the Related Art

Air dryers for railway use are typically a "pressure-swing adsorption" type, also referred to as a twin-tower, desiccant air dryer. The basic control scheme for switching between the two columns of desiccant is a fixed timer enabled by a "compressor ON" signal from the compressor controls. Whenever the compressor is running, the air dryer cycles between two columns of desiccant at a fixed time cycle to direct wet product air through one column to remove the water vapor, thus resulting in dry product air, while simultaneously taking a fraction of the dry product air and counter-flowing it through the other previously saturated column of desiccant to remove accumulated moisture. Although simple and robust, this control scheme is inefficient and wastes considerable energy.

A typical AAR locomotive air supply system consists of a compressor and two main reservoirs in series, MR1 and MR2. The air dryer is usually installed between MR1 and MR2, so that dry air is delivered to MR2. MR2 is used as an exclusive air source for the train braking system and is protected by a back-flow check valve between MR1 and MR2. The air in MR1 is used for other locomotive air consumers like the windshield wipers, horn, sanders, etc. When the air is consumed from either MR1 or MR2, the compressor will operate to recharge the system. If the air pressure in MR1 is less than MR2, the compressor will operate so that air flows into MR1 to recharge it, but air will not flow into MR2 until the pressure in MR1 is greater than the pressure in MR2. In this situation, the air dryer regeneration cycle is enabled by a compressor 'on' signal. Because there is no air flow between MR1 and MR2, however, there is no air flow through the air dryer. As a result, the dry product purge air consumed by the air dryer regeneration cycle is wasted.

The second inherent inefficiency of the existing fixed timer regeneration control scheme is that it assumes that the water content of the incoming "wet" air is constant, and the fixed timing cycle is based on the worst case for maximum flow and maximum wet air. The amount of water vapor in air is directly proportional to the saturation water vapor partial pressure, which has a highly non-linear, exponential-like, relation with temperature. For example, the saturation water vapor partial pressure at 0° F. is 0.01857 pounds per square inch absolute (psia); at 70° F. it is 0.3633 psia; at 125° F. it is 1.9447 psia, and at 150° F. it is 3.7228 psia. By contrast, air at 125° F. can contain 5.35 times as much water vapor as air at 70° F., and air at 150° F. can contain 10.2 times as much water vapor as air at 70° F. Thus, air at 125° F. can contain 105 times as much water vapor as air at 0° F., and air at 150° F. can contain 200 times as much water vapor as air at 0° F.

Thus, it is clear that an air dryer fixed cycle time regeneration cycle which is established on the water holding capacity of the desiccant bed and the water content of saturated air at the maximum inlet air temperature, e.g., 150° F. will cycle much more frequently than is necessary for lower temperatures and thus will waste dry product purge air. For example, a system designed to handle 150° F. saturated air, will be cycling 10.2 times too much at 70° F. and 200 times too much at 0° F. Thus, at 70° F., there is an opportunity to save approximately (17%–17%/10.2)=15% product air and compressor energy this is being wasted. As a result, there is a need in the art for an air dryer having a more efficient regeneration cycle control system.

BRIEF SUMMARY OF THE INVENTION

The present invention comprises a control system for an air dryer that switches the flow and counter flow of air through each of two desiccant towers in response to the actual humidity of air being dried by the air dryer. The air dryer includes a humidity sensor, a temperature sensor in the outlet air, and a temperature sensor in the inlet air stream to determine when to initiate the regeneration of the desiccant. A fully regenerated desiccant bed provides the maximum drying performance, as the desiccant bed becomes progressively saturated the drying performance declines until the drying performance reaches zero when the desiccant bed is fully saturated with water. The air dryer system is generally specified to provide some minimum drying performance, for example 40° C. dew point suppression.

The control system of the air dryer is configured to measure the inlet air temperature, the outlet air temperature, and the outlet relative humidity. The control system then calculates the instantaneous dew point suppression. If the measured DPS is equal to or greater than the minimum target DPS, then the air dryer continues to flow air through that particular dryer circuit (for example circuit A). The measurement and calculation process continues and repeats at a regular time interval. When the calculated DPS temperature is less than the minimum target DPS, the control system switches from drying circuit A to circuit B, and initiates a regeneration cycle on drying circuit A.

This closed loop control of the regeneration cycle using the humidity sensor accounts for the temperature dependent water volume in air and for variable flow rate through the air dryer. The dryer only initiates a regeneration cycle when the desiccant is saturated with water such that the outlet DPS is less than or equal to the minimum target. Because the drying performance is also dependent on the "residence time" of the air in the desiccant bed, air which flows through the desiccant bed at a low flow rate may achieve a higher DPS for the same relative desiccant bed condition than air which flows through the desiccant bed at a high flow rate. By measuring and calculating the outlet DPS, the regeneration is optimized for any flow rate.

A maximum time interval between regeneration events may be provided, for example 30 minutes, and a minimum time between regeneration intervals, for example 2 minutes, to provide a minimum level of performance in the event of a sensor or component failure.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
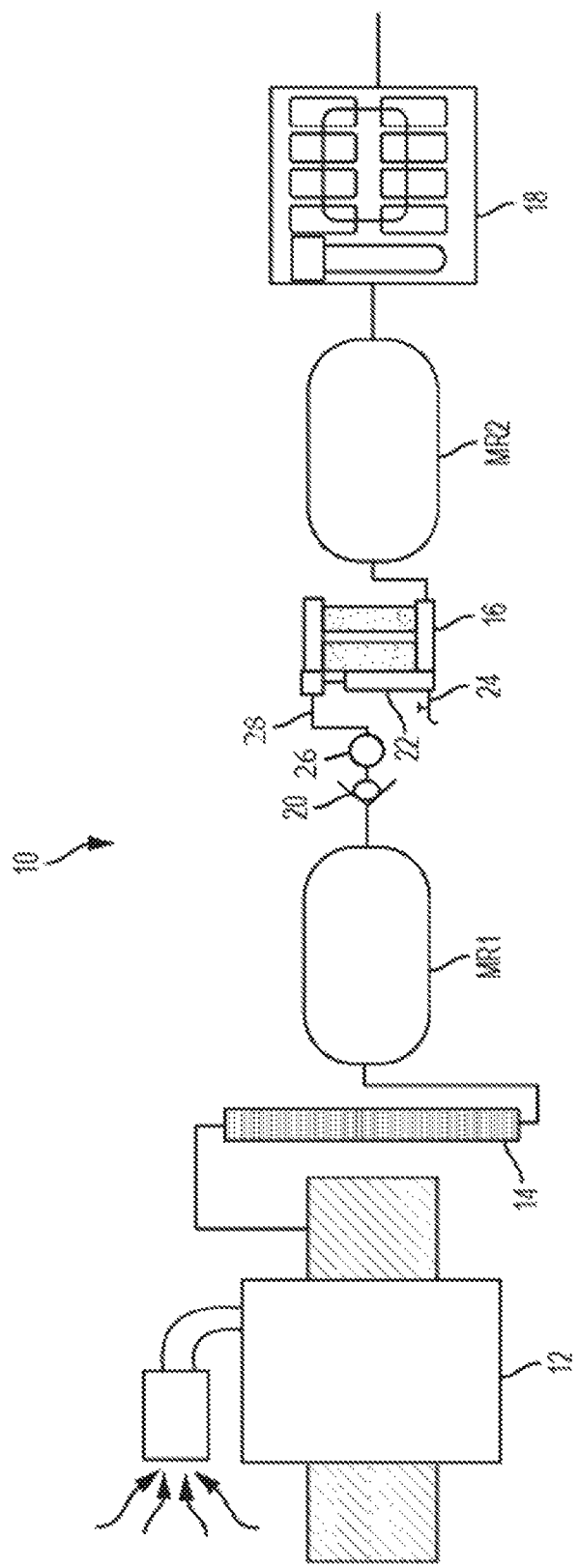
FIG. 1 is a schematic of a locomotive air supply system including a twin-tower, desiccant air dryer having a closed loop feedback control system according to the present invention may be used.

Referring now to the drawings, wherein like reference numerals refer to like parts throughout, there is seen in FIG. 1 a locomotive air system 10 having an air compressor 12, aftercooler 14, first and second main reservoirs MR1 and MR2, and a two-tower desiccant air dryer 16 having desiccant regeneration control according to the present invention, as more fully described below. Second main reservoir MR2 is coupled to the braking system 18 and a check valve 20 is positioned between the first and second main reservoirs MR1 and MR2. A pre-filtration stage 22, which may be separate or integral as described herein, is associated with air dryer 16 and includes a drain valve 24 that is operated according to a drain valve purge cycle time.

Figure 2:
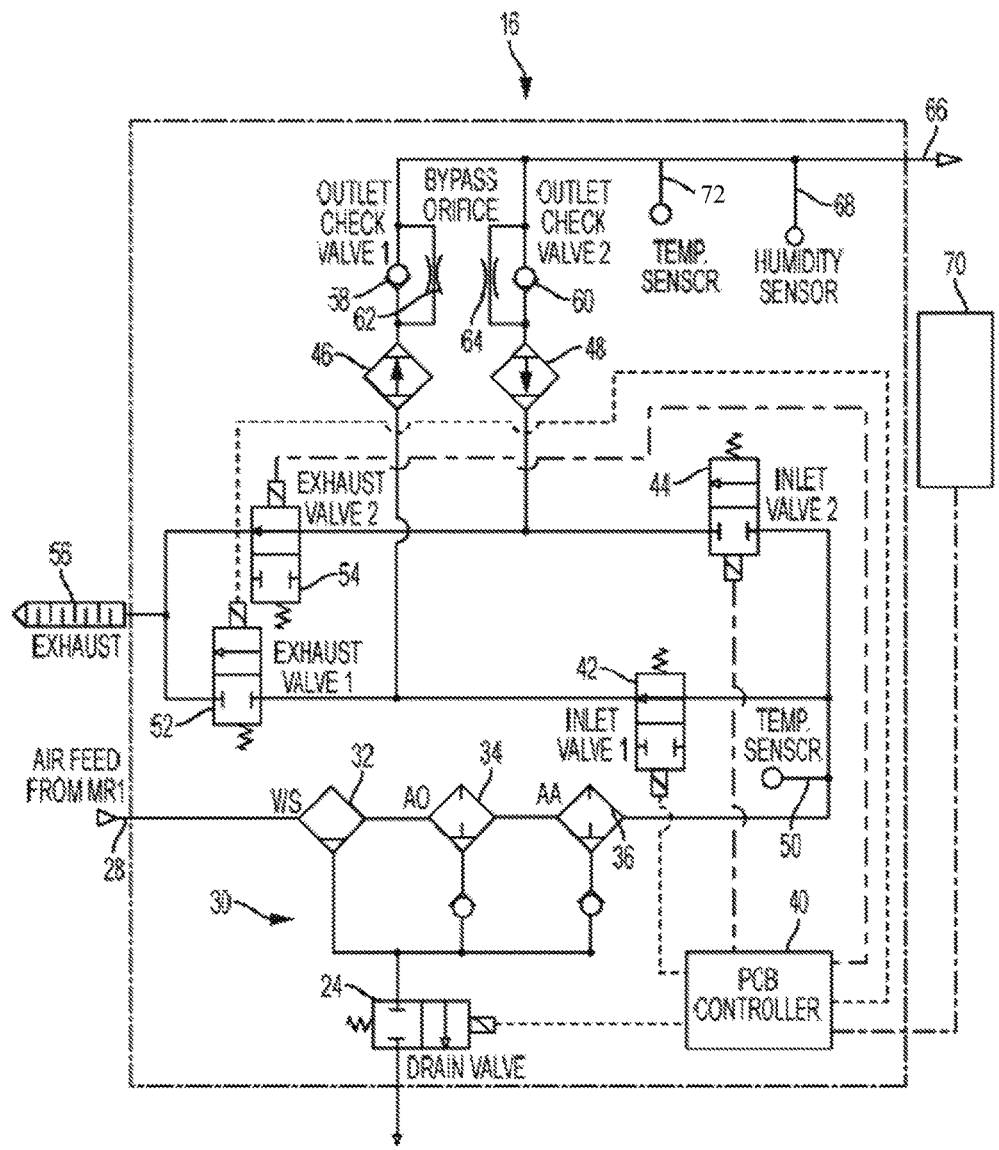
FIG. 2 is a schematic of a twin-tower, desiccant air dryer having a closed loop feedback control system according to the present invention may be used.

Referring to FIG. 2, two-tower desiccant air dryer 16 includes inlet 28 for receiving air from first main reservoir MR1. Inlet 28 is in communication with an integral pre-filtration stage 30, shown as comprising a water separator 32, a coarse coalescer 34, and a fine coalescer 36. Any accumulated liquids in water separator 32, coarse coalescer 34, and fine coalescer 36 are expelled through drain valve 24. A pair of inlet valves 42 and 44 are positioned downstream of pre-filtration stage 30 for diverting incoming air between one of two pathways, each of which is associated with one of two desiccant towers 46 and 48. A temperature sensor 50 is positioned upstream of inlet valves 42 and 44 and downstream of pre-filtration stage 30. The first pathway downstream of first inlet valve 42 leads to an exhaust valve 52 and first desiccant tower 46. The second pathway downstream of second inlet valve 44 leads to a second exhaust valve 54 and second desiccant tower 48. The first pathway further includes a first check valve 58 and first purge orifice 62 downstream of first desiccant tower 46, and the second pathway further includes a second check valve 60 and purge orifice 64 downstream of second desiccant tower 48. A single outlet 66 is coupled to the end of the first and second pathways, and a humidity sensor 68 and a second temperature sensor 72 are positioned upstream of outlet 66. Inlet valves 42 and 44 and outlet valves 52 and 54 are piloted by controller 40.

Controller 40 operates inlet valves 42 and 44 and outlet valves 52 and 54 so that compressed air provided at inlet 28 is directed through one of desiccant towers 46 or 48 for drying. The other of desiccant towers 46 or 28 may be regenerated by allowing dried air to reflow through purge orifice 62 or 64 and out of exhaust valve 52 or 54 as needed. Controller 40 is also in communication with temperature sensor 50, humidity sensor 68, and temperature sensor 72. A heating element 70 may also be coupled to controller 40 and positioned in air dryer 16 to warm drain valve 24, inlet valves 42 and 44 and outlet valves 52 and 54 if the temperature is below freezing.

Figure 3:
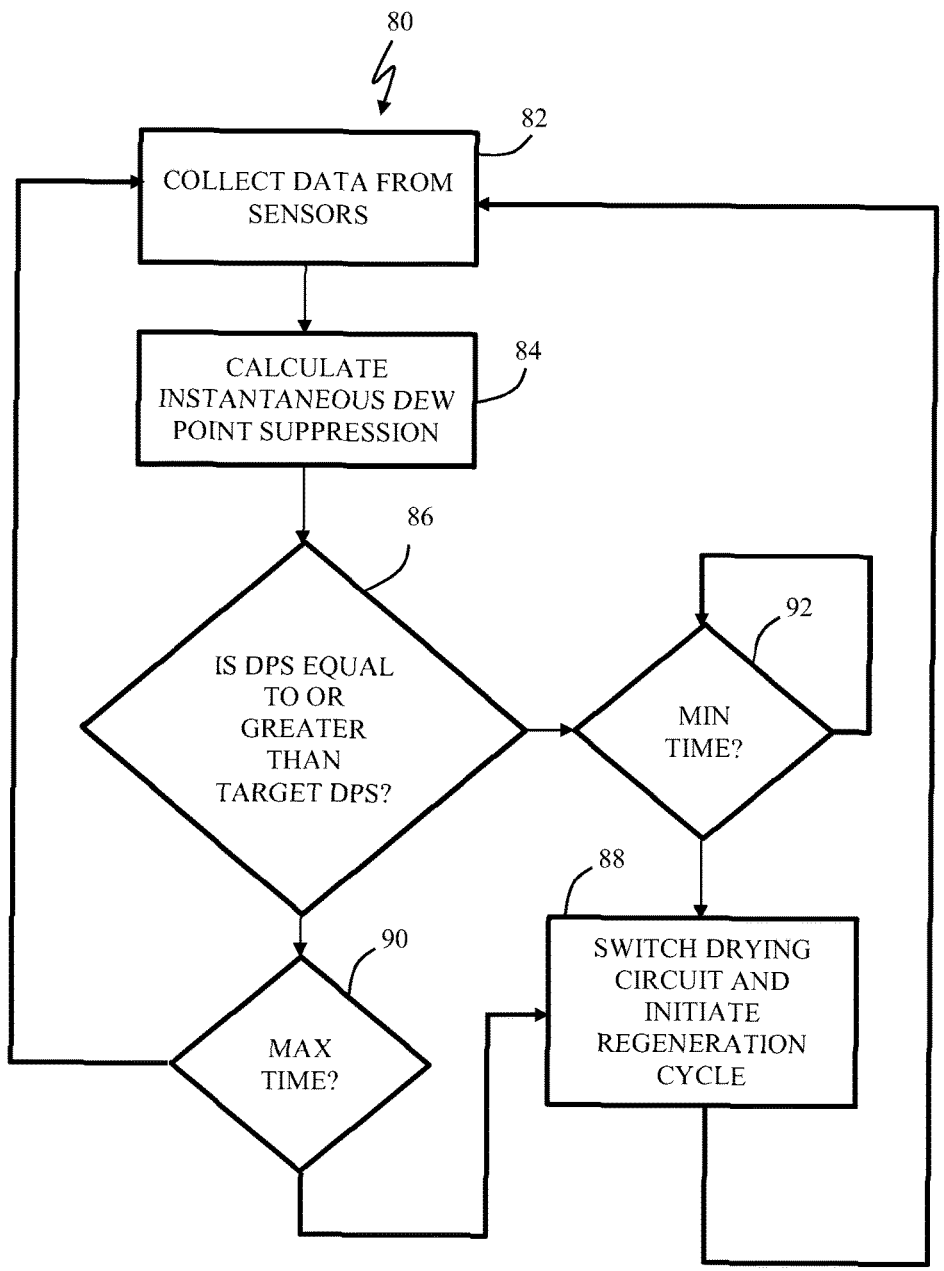
FIG. 3 is a flowchart of a closed loop feedback control system for an air dryer according to the present invention may be used.
Figure 4:
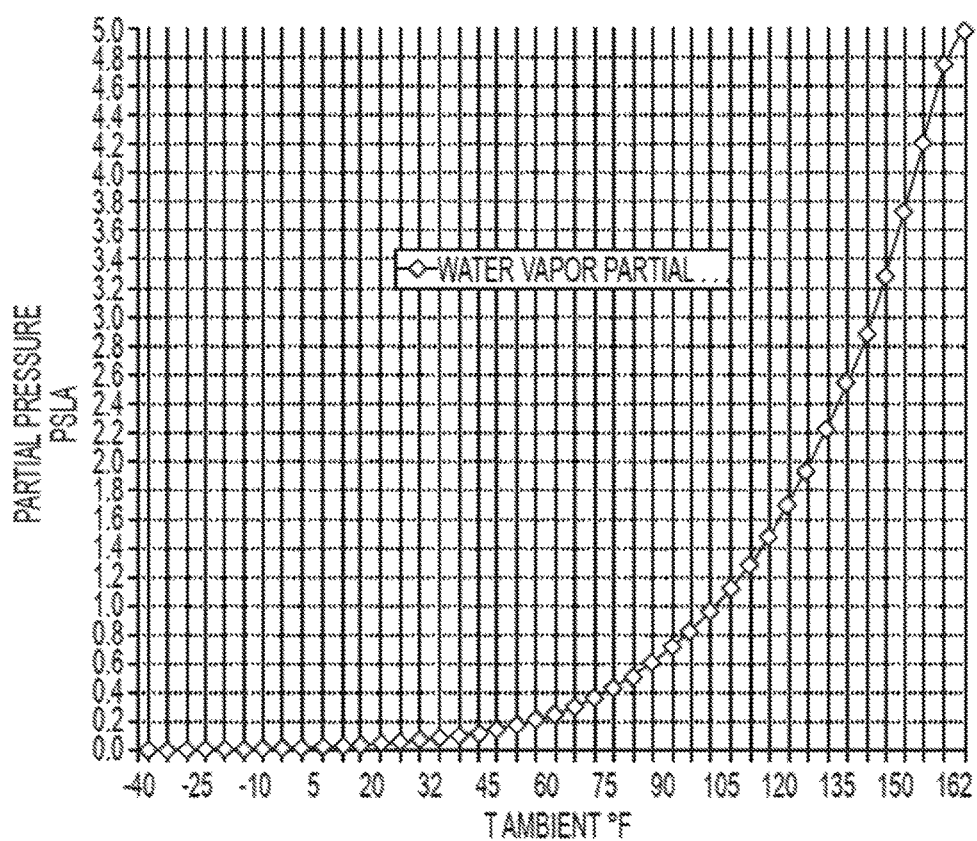
FIG. 4 is a graph of water vapor partial pressure verses ambient temperature for use in programming the control system of the present invention.

Referring to FIG. 3, controller 40 is programmed to implement a closed loop humidity feedback process 80 that switches the flow and counter flow of air through each of two desiccant towers in response to the actual humidity of air being dried by air dryer 16. Controller 40 collects data 82 from temperature sensor 50, humidity sensor 68, and temperature sensor 72 in the outlet air to determine when to initiate the regeneration of the desiccant. A fully regenerated desiccant bed provides the maximum drying performance, as the desiccant bed becomes progressively saturated the drying performance declines until the drying performance reaches zero when the desiccant bed is fully saturated with water. As an air dryer system is generally specified to provide some minimum drying performance, for example 40° C. dew point suppression, controller 40 may be programmed to ensure that air dryer 16 is meeting that requirement and, when it is not, switch the dryer circuit from the saturated circuit to the unsaturated circuit and perform a regeneration cycle on the saturated desiccant in the saturated circuit so that it is ready to use in the future. For example, using the data collected from temperature sensor 50, humidity sensor 68, and temperature sensor 72, controller can calculate 84 the instantaneous dew point suppression (DPS) of air dryer 16. DPS may be calculated using measured inlet air temperature and the measured outlet humidity using the known relationship between temperature and water vapor partial pressure, such as that seen in FIG. 4. As example, the August-Roche-Magnus approximation calculates dew point temperature ° C. (TD) as a function of temperature ° C. (T) and relative humidity (RH) as:

$$TD=243.04*(((LN(RH/100)+((17.625*T)/(243.04+T)))/(17.625-LN(RH/100)-((17.625*T)/(243.04+T))).$$

Other equations and methods for calculating dew point temperature using air temperature and RH are well known in the field of psychometrics. The August-Roche-Magnus approximation is thus shown as example, and the invention is not limited to its use as other approaches would also be sufficient.

The inlet air is assumed to be at 100% RH, i.e., having a dew point temperature equal to the inlet temperature as a consequence of the 10:1 compression ratio of the air system. The dew point suppression is calculated as the difference between inlet dew point temperature and the calculated outlet dew point temperature. If a check 86 determines that the measured DPS is equal to or greater than the minimum target DPS, then air dryer 16 continues to flow air through the particular dryer circuit currently being used, such as circuit A. Controller 40 then repeats the collection of relevant data at regular time intervals until the measured DPS is no longer equal to or greater than the minimum target DPS. When the calculated DPS temperature is less than the minimum target DPS at check 86, controller 40 switches from drying circuit A to circuit B 88, and initiates a regeneration cycle on drying circuit A. It should be recognized that the target DPS is a threshold and that system 10 could also be configured to initiate a regeneration cycle in when the calculated DPS is equal to or less than the target DPS and not initiate when the DPS is more than the target DPS. Similarly, the threshold DPS could include a narrow tolerance.

This closed loop control of the regeneration cycle by controller 40 using temperature sensor 50, humidity sensor 68, and temperature sensor 72 accounts for the temperature dependent water volume in air and for variable flow rate or air through the air dryer. Air dryer 16 thus only initiates a regeneration cycle when the desiccant is the circuit being used actually becomes saturated with water such that the outlet DPS is less than or equal to the minimum threshold. Because the drying performance of air dryer 16 is also dependent on the "residence time" of the air in the desiccant bed, air which flows through the desiccant bed at a low flow rate may achieve a higher DPS for the same relative desiccant bed condition than air which flows through the desiccant bed at a high flow rate. By measuring and calculating the outlet DPS, the regeneration is optimized for any flow rate.

It should be recognized that controller 40 may be programmed to calculate the particular amount of water content in outlet 66 using humidity sensor 68 and compare that against predetermined standards or maximum allowable content for a particular braking system 18. Referring to FIG. 3, a maximum time interval 90 between regeneration events may be provided regardless of calculated saturation, for example 30 minutes, and a minimum time 92 between regeneration intervals regardless of calculated saturation, for example 2 minutes, to provide a minimum level of performance in the event of a sensor or component failure so that air dryer 16 continues to remove moisture from the compressed air, albeit less efficiently than when closed loop control is functioning.

Because air dryer 16 is typically installed between MR1 and MR2, the actual air flow through air dryer 16 is further dependent on the relative charge state of MR1 and MR2. For example if both MR1 and MR2 are equally depleted at the time the compressor runs, then half the compressor flow fills MR1 and half goes through the air dryer to MR2. For example, depending on engine speed during that recharge event, the air dryer might see between 50 SCFM and 92 SCFM. As further example, if the pressure in MR1 was depleted and the pressure in MR2 is at full recharge level (recall there is a check valve between MR1 and MR2), then 100% of the compressor flow will recharge MR1 while there is no flow through the air dryer. Lastly, air can flow from a fully charged MR1 to MR2 (and thence to the train brakes) through the air dryer when the compressor is off. Thus, it is seen that the flow through the air dryer can vary from 0 to 100% of rated compressor output. The desiccant bed in air dryer 16 can hold a fixed amount of water before it is saturated and the time for the bed to become saturated is dependent on both the air temperature (warmer air can hold more water vapor) and on the volume of air which has flowed through the desiccant. The closed loop, variable regeneration control of controller 40 addresses both the temperature effect and flow and only regenerates when the desiccant bed approaches saturation.

Example 1

Figure 5:
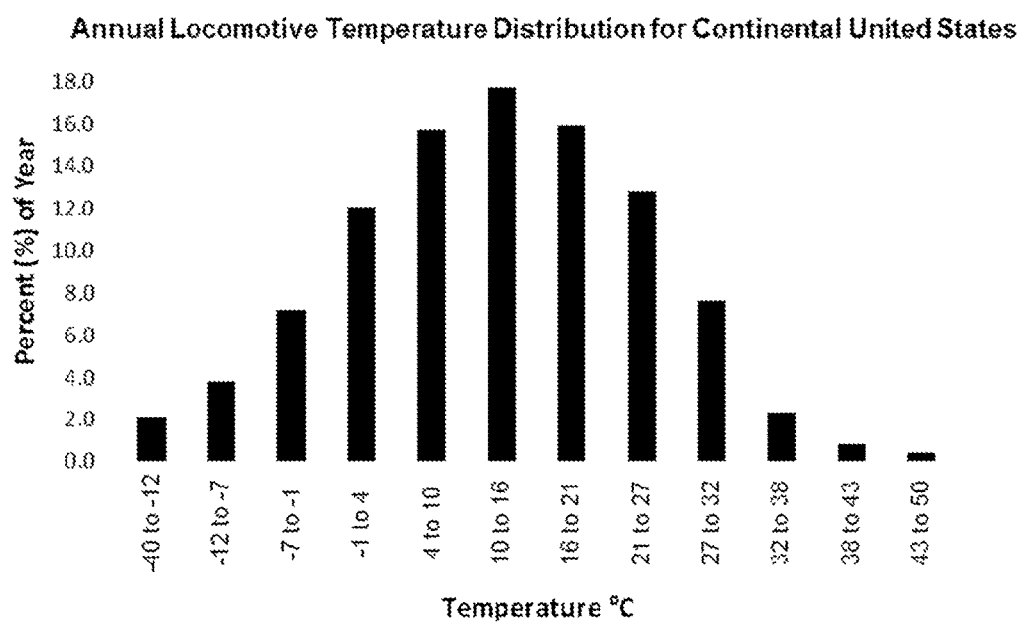
FIG. 5 is a graph of an environmental distribution profile for the United States used to model the improved efficiency of the air dryer of the present invention over conventional air dryers.

Referring to FIG. 5, the purge air savings of air dryer verses a conventional control scheme can be estimated using an environmental distribution profile of a target geographic area, such as the United States, representing the amount of time a given locomotive is exposed to environmental temperatures in a typical year. The comparison assumes a locomotive year of 8141 hours (95% of a calendar year), a compressor 12 that runs 1625 loaded hours in a locomotive year, and flow rate through air dryer 16 of 100 SCFM. Train leakage is assumed to be a continuous 20 SCFM. A conventional air dryer is modeled with a 65 second drying cycle and a 65 second regeneration cycle consisting of 48 seconds of purge and 17 seconds of re-pressurization and it is assumed that the conventional air dryer only cycles when the compressor is ON. Purge loss is conservatively assumed to be 15% (15 SCFM), which attempts to account for memory function and flow dependent purge volume.

Air dryer 16 according to the present invention is modeled with a temperature-dependent variable drying cycle and includes a fixed regeneration time of 110 seconds followed by 10 second repressurization. To calculate the drying cycle time, the water loading rate is calculated at each temperature range for both 100 SCFM (recharge of MR2 when the compressor is ON) and 20 SCFM (flow through the air dryer to MR2 and out as BP leakage). The drying cycle time is then calculated based on the known water capacity of the desiccant tower and the rate of water loading. In this example, the maximum drying cycle time of the combined cycle A plus B is limited to 3600 seconds (1 hour), although at low temperatures, this time could be further extended. Air dryer 16 operates independently of compressor 12 and will regenerate when needed regardless of the compressor operating state.

Figure 6:
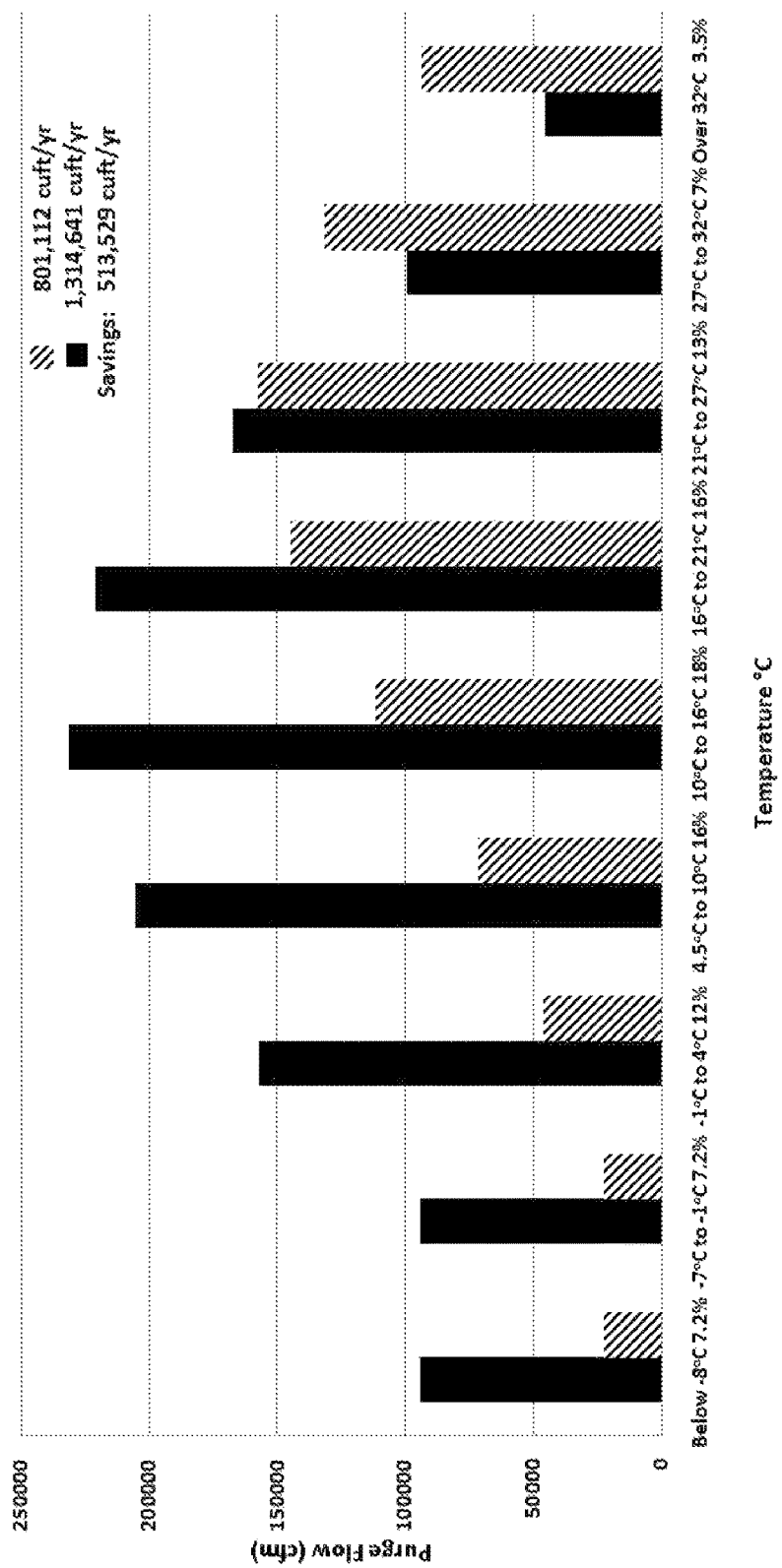
FIG. 6 is a chart of the amount of purge air used by the air dryer of the present invention over conventional air dryers.

Referring to FIG. 6, operating for one year in the environmental profile typical of the continental United States, air dryer 16 is calculated to use 513,500 cubic feet less purge air than the conventional air dryer. Assuming a cost of $0.32 per 1000 ft$^3$ to compress air, this represents an annual savings of $164.

One additional benefit of air dryer 16 is that is overcomes a deficit in the conventional air dryer control scheme. A conventional air dryer only regenerates when the compressor is operating, but 80% of the time the compressor is off. However, train leakage is continuous, so when the main reservoirs MR1 and MR2 are charged, the compressor shuts off and the air in both main reservoirs MR1 and MR2 supply the brake pipe until the pressure in MR1 drops to the pressure governor set point and the compressor restarts. The air that flows from MR1 through the air dryer to MR2 while the compressor is off is thus not recognized by the conventional art air dryer control scheme and can overload a conventional air dryer desiccant bed at higher temperatures such that the air dryer is not drying effectively. Air dryer 16 of the present invention, however, will continue to provide sufficient drying because it will cycle based on the humidity of the air being dried and not simply according to a predetermined time period when the compressor is running.

Air dryer 16 also provides significant advantage at low temperatures. At temperatures below freezing, air dryer 16 uses much less purge air than a conventional air dryer. This is an advantage as overall train leakage increases at low temperatures and the reduced air consumption of air dryer 16 provides a beneficial offset.

Example 2

In a field trial, air dryer 16 was able to maintain a minimum 40° C. (72° F.) dew point depression, with more than 80% of the purge cycles occurring at the cycle maximum of an hour. In this case, a cycle is the cycle time for tower A and tower B in sequence. For comparison, the same cycle on a conventional air dryer is just under 2 minutes. Because air dryer 16 uses closed-loop humidity feedback to initiate the purge cycle, it accounts for both much lower moisture loading at low temperatures and for actual air flow through the dryer. The optimized purge provides both an energy and air savings by not "wasting" purge air, and importantly reduces the wear and tear on the air dryer components, extending the useful life of air dryer 16. For example, the test air dryer 16 operated for 3427 hours and in that time has made approximately 3000 purge cycles. Had air dryer 16 instead utilized the traditional 2-minute purge (1 minute A, 1 minute B), assuming memory mode operation where it only cycles with the compressor ON and loaded (20% of 3427 hours), it would have been subject to 38,000 purge cycles. Furthermore, air dryer 16 used almost 450,000 cubic feet ($ft^3$) less purge air over the given time period than a conventional air dryer. In addition to the clear savings resulting from less wasted purge air, the very significant reduction in the number of purge events mean that the valves in air dryer 16 are subject to much less wear and tear, yielding a longer useful life and higher lifetime reliability.

What is claimed is:

1. A control system for an air dryer having two desiccant towers that can switch the flow and counter flow of air between one of two drying circuits, each of which is associated with a respective one of the two desiccant towers, the control system comprising:
   a first temperature sensor for positioning in an inlet of the air dryer that is configured to output a first signal corresponding to the temperature of an inlet air stream;
   a second temperature sensor for positioning in an outlet of the air dryer that is configured to output a second signal corresponding to the temperature of an outlet air stream;
   a humidity sensor for positioning in the outlet of the air dryer to output a third signal corresponding to the humidity of the outlet air stream; and
   a controller interconnected to the first temperature sensor, the second temperature sensor, and the humidity sensor that is programmed to calculate whether one of the two desiccant towers is saturated based at least in part on the humidity of the outlet air stream and to command the air dryer to switch the flow of air to the other of the two desiccant towers when one of the two desiccant towers is saturated;
   wherein the controller is programmed to determine whether one of the two desiccant towers is saturated by calculating an instantaneous dew point suppression and comparing the instantaneous dew point suppression against a predetermined threshold.

2. The system of claim 1, wherein the controller is programmed to determine whether one of the two desiccant towers is saturated when the instantaneous dew point suppression is less than the predetermined threshold.

3. The system of claim 2, wherein the controller is programmed to not determine that one of the two desiccant towers is saturated when the instantaneous dew point suppression is at least as great as the predetermined threshold.

4. The system of claim 3, wherein the controller is programmed to not command the air dryer to switch the flow of air to the other of the two desiccant towers unless a predetermined minimum time period has been exceeded.

5. The system of claim 4, wherein the controller is programmed to command the air dryer to switch the flow of air to the other of the two desiccant towers if a predetermined maximum time period has been exceeded.

6. The system of claim 5, wherein the controller is programmed to calculate the instantaneous dew point suppression using the August-Roche-Magnus approximation.

7. A method of controlling an air dryer to switch the flow and counter flow of air between one of two drying circuits, each of which is associated with a respective one of the two desiccant towers, comprising the steps of:
   sensing the temperature of an inlet air stream in the inlet of the air dryer;
   sensing the temperature of an outlet air stream in the outlet of the air dryer;
   sensing the humidity of the air stream in the outlet;
   calculating whether one of the two desiccant towers is saturated based at least in part on the humidity of the air stream in the outlet by calculating an instantaneous dew point suppression and comparing the instantaneous dew point suppression against a predetermined threshold; and
   switching the flow of air to the other of the two desiccant towers when the one desiccant tower is calculated to be saturated.

8. The method of claim 7, wherein the step of calculating whether one of the two desiccant towers is saturated further comprises determining that one of the two desiccant towers is saturated when the instantaneous dew point suppression is less than the predetermined threshold.

9. The method of claim 8, wherein the step of calculating whether one of the two desiccant towers is saturated further comprises not determining that one of the two desiccant towers is saturated if the instantaneous dew point suppression is greater than the predetermined threshold.

10. The method of claim 9, wherein the step of switching the flow of air through the other of the two desiccant towers is not executed unless a predetermined minimum time period has been exceeded.

11. The method of claim 10, further comprising the step of switching the flow of air through the other of the two desiccant towers if a predetermined maximum time period has been exceeded.

12. The method of claim 11, wherein the step of calculating whether one of the two desiccant towers is saturated comprises calculating the instantaneous dew point suppression using the August-Roche-Magnus approximation.

* * * * *